United States Patent Office 3,429,730
Patented Feb. 25, 1969

3,429,730
COATING OF THE SURFACES OF LIGHT TRANSPARENT MATERIALS ASSOCIATED WITH LIGHT SOURCES
David G. Guthrie, Chalvey, Slough, England, assignor to Saunders Roe & Nuclear Enterprises Limited, Hayes, England
No Drawing. Continuation of application Ser. No. 377,092, June 22, 1964. This application Feb. 5, 1968, Ser. No. 703,181
Claims priority, application Great Britain, June 27, 1963, 25,537/63
U.S. Cl. 117—18   8 Claims
Int. Cl. C09k 1/36; B44c 1/06

ABSTRACT OF THE DISCLOSURE

An improved process for forming a coating of a substantially uniform thickness onto a surface, as for forming a layer of binder material on the interior surface of a glass body to be used as a light source. A coating material is spread onto the surface as a layer which adheres to the said surface. A plurality of small beads are placed adjacent the surface and moved vigorously, for example, by vibration, in an enclosed area including the surface, so that the beads move against and relative to the surface to spread the said coating material evenly about the surface until the thickness of the coating is substantially uniform.

---

This application is a continuation of application Ser. No. 377,092, filed June 22, 1964.

This invention relates to improvements in processes for forming uniform coatings upon surfaces during the manufacture of light sources.

It is known to coat the internal surfaces of fluorescent light sources, nuclear energised light sources and cathode ray tubes by a method wherein a solution of binder or fixative, such as orthophosphoric acid dissolved in acetone or diethyl ether, is added to a container, hollow body or tube in sufficient quantity to produce a desirable thickness when distributed, and the solution spread around the walls. Air is blown into the container to evaporate the solvent and leave the binder adhering as a viscous layer around the inside surface. Phosphor, in powder form, is added, and the container shaken vigorously to cause the phosphor to form a coating over the viscous binder. Excess phosphor is removed and the container is baked to alter the state of the binder and fix the phosphor in position.

When using this method of producing a phosphor coating it is desirable to use the least possible coating of binder, as excess impairs the efficiency of light production. This restriction upon the quantity of the binder makes it difficult to obtain a uniform distribtuion of the binder within the container, particularly when coating containers, hollow bodies or tubes of small size, of complicated shape or with small access passages. It is, therefore, an object of the invention to provide means for improving the distribution of materials such as, for example, binders, when forming coatings for light sources.

Accordingly, this invention consists in a process for forming a coating of substantially uniform thickness of material on a surface or surfaces during the manufacture of light sources, wherein inert balls, pellets or beads are used to spread said material over said surface or surfaces.

Other objects and advantages of the invention will become more readily apparent from the following detailed description of coating a container with phosphor which is by way of example only.

The process of phosphor coating a small glass container or bulb of about 2 cm. diameter is commenced in the same manner as hereinbefore described by adding the required quantity of phosphoric acid binder. This quantity may be as little as 0.0005 ml. of acid, and may be conveniently added as a 1% solution of 90% w./w. orthophosphoric acid in acetone. The acetone is evaporated away with warm air, leaving the binder within the bulb.

The next stage is to obtain a substantially uniform distribution of the orthophosphoric acid binder contained within the bulb, and this stage forms the principal feature of the invention. The binder is spread by using pellets, small balls or beads of a chemically inert substance, often, when composed of glass, described as ballotini. In this embodiment of the invention, about half a gram of small glass beads measuring approximately half a millimeter in diameter are inserted into the bulb, and the bulb is tapped sharply or attached to a vibrator and shaken vigorously. It has been found that shaking the bulb for three minutes at 50 cycles per second at an amplitude of 1 to 2 cm. produces an adequately uniform spread. The beads are then tipped out and a phosphor added and shaken. Excess phosphor is removed, leaving a substantially uniform coat of phosphor upon the viscous binder spread form over the internal surface of the bulb. The bulb is then baked to fix the binder and the phosphor firmly in position.

Variations may be made in the size of the glass balls used, to distribute the optimum amount of binder required to produce the most suitable thickness of phosphor coating for any particular phosphor particle size.

Other binders, such as, for example, sodium or potassium silicate, which are not themselves viscous and cannot be spread in a sticky layer like phosphoric acid, are still capable of utilising the invention by varying the process in the following manner. A solution of pure viscous liquid, such as, for example, glycerol dissolved in acetone or diethyl ether, is added to the container to be coated, and the solvent evaporated. The viscous liquid is spread around the surfaces of the container as before, in a substantially uniform layer by vibrating small glass balls. Excess phosphor is added, shaken around, and the surplus tipped out, leaving an even coating of phosphor adhering to the viscous liquid. A solution of binder is added, and this spreads around the internal surfaces of the container by capillary attraction over the phosphor. When all the phosphor is wetted the bulb is dried and baked. Baking evaporates both the viscous fluid used to distribute the phosphor and the binder solvent, and firmly fixes the phosphor inside the container.

A particularly valuable application of the invention, given by way of example only, is to improve the uniformity of phosphor coatings upon glass containers for self-luminous light sources activated by gaseous radionucleide. The efficiency of these light sources depends significantly upon the uniformity of the phosphor coating, and reductions may be made in the quantity of radioactive gas used to produce a given intensity of light if the uniformity of the phosphor coating is improved.

It will be obvious to those skilled in the art that the invention is not limited to the embodiments hereinbefore described, but may be used in its widest sense to spread a coating of any material upon any surface, container or hollow body of any shape, size or means of access to the interior in an equally satisfactory manner. For example if it is desired to coat a flat surface or an external surface either wholly or partly, this may be achieved by affixing a shroud having a means of access over the surface to be coated, and proceeding as herein before described.

Variations may be made in the quantity, size or shape of the pellets, balls or beads, or of the inert material which they are composed, and in the duration, frequency amplitude or path of the vibrations, to suit any particular requirements. Numerous other variations and modific tions may also be made to the materials of the container, to the form or substance of the phosphor, binder or other materials employed, to any solvents and the means for evaporating them, to the means of fixing the binder by any physical or chemical process, or to the means or order of distributing these materials, whilst still employing the invention to assure a substantially uniform coating.

I claim:

1. In a method of providing a phosphor layer on a surface wherein the phosphor material is adhered to a viscous layer provided on the surface, the improvement which comprises:

(a) applying to at least part of a surface a liquid solution comprising a solvent and a viscous material;
    (b) evaporating the solvent to provide a layer of said viscous material adhering to said surface;
    (c) providing a plurality of small beads adjacent said viscous layer;
    (d) moving said beads adjacent to said surface to smooth said layer of viscous material;
    (e) removing said beads; and
    (f) contacting the smoothed layer of viscous material with phosphor material to provide a layer of phosphor material on said surface.

2. In a method according to claim 1, the improvement wherein said viscous material comprises a binder and wherein said method includes the step of heating the phosphor-coated surface to fix the phosphor layer on said surface.

3. In a method according to claim 2, the improvement wherein said viscous material comprises orthophosphoric acid.

4. In a method according to claim 1, the improvement wherein a layer of binder material is provided on said phosphor layer and wherein said method includes the step of heating the binder-coated surface to remove said viscous material and to fix the phosphor layer on said surface.

5. In a method according to claim 4, the improvement wherein said binder comprises sodium silicate, potassium silicate, or mixtures thereof.

6. In a method according to claim 1, the improvement wherein said surface is the internal surface of a hollow body.

7. In a method according to claim 6, the improvement wherein said hollow body is a glass bulb or glass tube.

8. In a method according to claim 1, the improvement wherein said beads are glass beads.

References Cited

UNITED STATES PATENTS

| 2,075,518 | 3/1937 | Gettelman | 117—97 |
| 2,828,216 | 3/1958 | Delrieu | 117—33.5 X |
| 3,046,157 | 7/1962 | Nyman | 117—97 |
| 2,075,518 | 3/1937 | Gettelman | 117—97 |
| 2,828,216 | 3/1958 | Delrieu | 117—33.5 X |

ALFRED L. LEAVITT, *Primary Examiner.*

W. F. CYRON, *Assistant Examiner.*

U.S. Cl. X.R.

117—26, 33, 33.5